(12) United States Patent
Carrette

(10) Patent No.: US 11,097,258 B2
(45) Date of Patent: Aug. 24, 2021

(54) CATALYST MADE FROM AN ORGANIC COMPOUND AND USE THEREOF IN A HYDROPROCESSING AND/OR HYDROCRACKING METHOD

(71) Applicant: IFP Energies nouvelles, Rueil-Malmaison (FR)

(72) Inventor: Pierre-Louis Carrette, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 212 days.

(21) Appl. No.: 16/321,098

(22) PCT Filed: Jun. 22, 2017

(86) PCT No.: PCT/EP2017/065386
§ 371 (c)(1),
(2) Date: Jan. 28, 2019

(87) PCT Pub. No.: WO2018/019492
PCT Pub. Date: Feb. 1, 2018

(65) Prior Publication Data
US 2019/0151834 A1    May 23, 2019

(30) Foreign Application Priority Data
Jul. 28, 2016 (FR) .................... 1657308

(51) Int. Cl.
| | |
|---|---|
| *B01J 37/20* | (2006.01) |
| *B01J 31/02* | (2006.01) |
| *B01J 37/02* | (2006.01) |
| *B01J 37/08* | (2006.01) |
| *B01J 38/52* | (2006.01) |
| *B01J 38/62* | (2006.01) |
| *B01J 23/882* | (2006.01) |
| *B01J 27/19* | (2006.01) |
| *B01J 31/04* | (2006.01) |
| *B01J 35/10* | (2006.01) |
| *C10G 47/10* | (2006.01) |
| *C10G 45/08* | (2006.01) |
| *B01J 27/051* | (2006.01) |
| *B01J 23/85* | (2006.01) |

(Continued)

(52) U.S. Cl.
CPC ........... *B01J 31/0209* (2013.01); *B01J 23/85* (2013.01); *B01J 23/882* (2013.01); *B01J 27/0515* (2013.01); *B01J 27/19* (2013.01); *B01J 31/0204* (2013.01); *B01J 31/0208* (2013.01); *B01J 31/0247* (2013.01); *B01J 31/04* (2013.01); *B01J 35/1019* (2013.01); *B01J 35/1042* (2013.01); *B01J 35/1061* (2013.01); *B01J 37/0203* (2013.01); *B01J 37/0205* (2013.01); *B01J 37/0236* (2013.01); *B01J 37/08* (2013.01); *B01J 37/20* (2013.01); *B01J 38/52* (2013.01); *B01J 38/62* (2013.01); *C10G 45/08* (2013.01); *C10G 47/10* (2013.01); *C10G 47/12* (2013.01); *B01J 21/04* (2013.01); *B01J 21/08* (2013.01); *B01J 21/12* (2013.01); *B01J 23/883* (2013.01); *B01J 23/94* (2013.01); *B01J 27/128* (2013.01); *B01J 27/28* (2013.01); *B01J 35/1014* (2013.01); *B01J 35/1038* (2013.01); *B01J 37/088* (2013.01); *B01J 38/12* (2013.01); *B01J 2523/00* (2013.01)

(58) Field of Classification Search
None
See application file for complete search history.

(56) References Cited

U.S. PATENT DOCUMENTS

| | | | |
|---|---|---|---|
| 5,248,412 A * | 9/1993 | Fujikawa | ............... B01J 23/85 208/213 |
| 9,079,174 B2 | 7/2015 | Simon et al. | |
| 2010/0105541 A1 | 4/2010 | Galliou et al. | |

FOREIGN PATENT DOCUMENTS

| | | | |
|---|---|---|---|
| EP | 2174711 B1 | | 9/2018 |
| WO | 13093229 A1 | | 6/2013 |
| WO | WO 2014030964 | * | 2/2014 |

OTHER PUBLICATIONS

WO 2014030964, machine generated English translation, Description (Year: 2014).*

(Continued)

*Primary Examiner* — Yun Qian
(74) *Attorney, Agent, or Firm* — Millen White Zelano and Branigan, PC; Csaba Henter

(57) ABSTRACT

The invention has as its object a catalyst that comprises a substrate based on alumina or silica or silica-alumina, at least one element from group VIII, at least one element from group VIB, and an organic compound of formula (I)

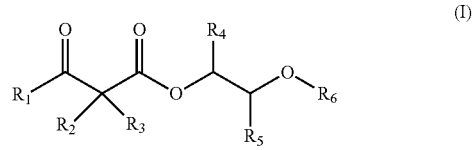

in which R1, R2, R3, R4 and R5 are selected from among a hydrogen atom, or a hydroxyl radical, or a hydrocarbon radical that comprises from 1 to 12 carbon atoms that can also comprise at least one oxygen atom, and R6 is selected from a hydrogen atom, a hydrocarbon radical that comprises from 1 to 12 carbon atoms that can also comprise at least one oxygen atom, a methacryloyl radical, an acryloyl radical or an acetyl radical. The invention also relates to the method for preparation of said catalyst and its use in a method for hydrotreatment and/or hydrocracking.

19 Claims, No Drawings

(51) Int. Cl.
*C10G 47/12* (2006.01)
*B01J 27/128* (2006.01)
*B01J 23/94* (2006.01)
*B01J 27/28* (2006.01)
*B01J 38/12* (2006.01)
*B01J 21/04* (2006.01)
*B01J 21/08* (2006.01)
*B01J 21/12* (2006.01)
*B01J 23/883* (2006.01)

(56) References Cited

OTHER PUBLICATIONS

WO 2014030964, machine generated English translation, claims (Year: 2014).*
Sang II Lee Et Al: preparation Of Comos Catalysts For Hydrodesulfurization Using Methylacetoacetate As A Chelating Agent Korean Journal of Chemical Engineering, Springer US, Boston, vol. 29, No. 3, Nov. 7, 2011 (Nov. 7, 2011), pp. 310-316, XP035023476, ISSN: 1975-7220.
Pashigreva A V Et Al: "activity And Sulfidation Behavior Of The Como/al" 2o"3 Hydrotreating Catalyst: The Effect Of Drying Conditions Catalysis Today, Elsevier, Amsterdam, NL, vol. 149, No. 1-2, Jan. 15, 2010 (Jan. 15, 2010), pp. 19-27, XP026815655, ISSN: 0920-5861.
International Search Report PCT/EP2017/065386 dated Sep. 18, 2017.(pp. 1-6).

* cited by examiner

CATALYST MADE FROM AN ORGANIC COMPOUND AND USE THEREOF IN A HYDROPROCESSING AND/OR HYDROCRACKING METHOD

The invention relates to a catalyst that is supplemented with an organic compound, its method for preparation and its use in the field of hydrotreatment and/or hydrocracking.

Typically, a catalyst for hydrotreatment of hydrocarbon fractions has as its object to eliminate the sulfur-containing or nitrogen-containing compounds that are contained in the latter so as to bring, for example, a petroleum product up to the required specifications (sulfur content, aromatic compound content, etc.) for a given application (automotive fuel, gasoline or diesel fuel, domestic fuel oil, jet fuel). It can also involve pretreating this feedstock so as to eliminate the impurities from it or to hydrogenate it before making it undergo various methods for transformation in order to modify its physico-chemical properties, such as, for example, the methods for reforming, hydrocracking of vacuum distillates, catalytic cracking, hydroconversion of atmospheric or vacuum residues. The composition and the use of hydrotreatment catalysts are particularly well described in the article by B. S. Clausen, H. T. Topsøe, and F. E. Massoth, obtained from the work Catalysis Science and Technology, Volume 11 (1996), Springer-Verlag.

The tightening of the automobile pollution standards in the European Community (Journal Officiel de l'Union européenne [Official Journal of the European Union], L76, Mar. 22, 2003, Directive 2003/70/CE, pages L76/10-L76/19) has forced the refiners to reduce the sulfur content to a very great extent in the diesel fuels and the gasolines (to the maximum 10 parts per million (ppm) by weight of sulfur on Jan. 1, 2009 versus 50 ppm on Jan. 1, 2005). Furthermore, the refiners are forced to use feedstocks that are increasingly refractory to hydrotreatment methods, on the one hand because the crudes are increasingly heavy and consequently contain more and more impurities, and on the other hand because of the increase in conversion methods in the refineries. Actually, the latter generate fractions that are more difficult to hydrotreat than the fractions that are directly obtained from atmospheric distillation. "More difficult to hydrotreat" usually means higher operating temperatures to reach the same sulfur content in the effluent, and consequently service lives that can be reduced. These feedstocks require catalysts that have hydrodesulfurizing and hydrogenating functions that are greatly improved in relation to traditional catalysts.

In addition, the methods for conversion such as catalytic cracking or hydrocracking use catalysts that have an acid function, which makes them particularly sensitive to the presence of nitrogen-containing impurities and particularly basic nitrogen-containing compounds. It is therefore necessary to use catalysts for pretreatment of these feedstocks so as to remove these compounds.

The conventional hydrotreatment catalysts generally comprise an oxide substrate and an active phase based on metals from groups VIB and VIII in their oxide forms as well as phosphorus. Preparation of these catalysts generally comprises a step for impregnation of metals and phosphorus on the substrate, followed by drying and calcination making it possible to obtain the active phase in the oxide forms thereof. Before their use in a hydrotreatment and/or hydrocracking reaction, these catalysts are generally subjected to sulfurization so as to form the active radical.

The addition of an organic compound to the hydrotreatment catalysts to improve their activity has been recommended by one skilled in the art, in particular for catalysts that have been prepared by impregnation followed by drying without subsequent calcination. These catalysts are often called "additive dried catalysts."

Numerous documents describe the use of different ranges of organic compounds as additives, such as organic compounds that contain nitrogen and/or organic compounds that contain oxygen.

A family of compounds that is now well known in literature relates to chelating nitrogen-containing compounds (EP0181035, EP1043069, and U.S. Pat. No. 6,540,908) with, by way of example, ethylenediaminetetraacetic acid (EDTA), ethylenediamine, diethylenetriamine or nitrilotriacetic acid (NTA).

In the family of organic compounds that contain oxygen, the use of mono-, di-, or polyalcohols that are optionally etherified is described in the documents WO96/41848, WO01/76741, U.S. Pat. Nos. 4,012,340, 3,954,673, EP601722, and WO2005/035691.

There are also multiple patents that claim the use of carboxylic acids (EP1402948, EP0482817). In particular, in the document EP0482817, citric acid, but also tartaric acid, butyric acid, hydroxyhexanoic acid, malic acid, gluconic acid, glyceric acid, glycolic acid, hydroxybutyric acid have been described. Specificity resides in the drying that is to be conducted at a temperature that is lower than 200° C.

The prior art more rarely mentions additives that comprise ester groups (EP1046424, WO2006/077326).

The document US2013/267409 describes the use of an organic compound of formula $R_1COCH_2COR_2$, in which $R_1$ and $R_2$ are identical or different and are selected from a group that consists of a C1 to C12 alkyl, a C6 to C12 allyl, a C1 to C12 alkoxy, and a hydroxy.

Regardless of the compounds that are selected, the modifications that are made do not always make it possible to increase the performance of the catalyst enough to meet the specifications relating to the sulfur and/or nitrogen contents of the fuels. In addition, it is often very complicated to initiate their industrial deployment as long as the methods are complex to implement.

Consequently, it is turning out to be essential—for the manufacturers of catalysts—to find new hydrotreatment and/or hydrocracking catalysts with improved performance.

SUMMARY

The invention relates to a catalyst that comprises a substrate based on alumina or silica or silica-alumina, at least one element from group VIII, at least one element from group VIB, and an organic compound of formula (I)

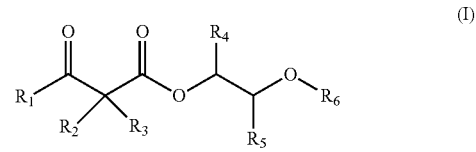

in which R1, R2, R3, R4 and R5 are selected from among a hydrogen atom, a hydroxyl radical, or a hydrocarbon radical that comprises from 1 to 12 carbon atoms that can also comprise at least one oxygen atom, and R6 is selected from among a hydrogen atom, a hydrocarbon radical that comprises from 1 to 12 carbon atoms that can also comprise at least one oxygen atom, a methacryloyl radical, an acryloyl radical or an acetyl radical.

The applicant actually noted that the use of the compound of formula (I) as an organic additive to a catalyst that contains at least one element from group VIII and at least one element from group VIB made it possible to obtain a hydrotreatment and/or hydrocracking catalyst showing improved catalytic performance.

Actually, the catalyst according to the invention shows an activity that is increased in relation to non-additive catalysts and to additive dried catalysts that are known. Typically, thanks to the increase in activity, the temperature that is necessary for reaching a desired sulfur or nitrogen content (for example, 10 ppm of sulfur in the case of a diesel fuel fraction, in ULSD or Ultra Low Sulfur Diesel mode according to English terminology) can be lowered. Likewise, stability is increased, because the service life is extended thanks to the necessary temperature reduction.

The catalyst according to this invention is in addition easy to prepare because of a high solubility of the compound of formula (I) in water or any other protic polar solvent.

According to a variant, the organic compound of formula (I) is selected from a derivative of the 3-oxobutanoates of 2-alkoxyethyl, in which R1 is a methyl group; R2, R3, R4 and R5 are hydrogen atoms; and R6 is selected from a hydrogen atom, a hydrocarbon radical that comprises from 1 to 12 carbon atoms that can also comprise at least one oxygen atom, a methacryloyl radical, an acryloyl radical or an acetyl radical.

According to a variant, the organic compound of formula (I) is selected from among 2-methyl-3-oxopropanoate of 2-methoxyethyl, 2-methyl-3-oxopropanoate of 2-ethoxyethyl, 3-oxobutanoate of 2-hydroxyethyl, 3-oxobutanoate of 2-hydroxypropyl, 3-oxobutanoate of 2-methoxyethyl, 3-oxobutanoate of 2-ethoxyethyl, 3-oxobutanoate of 2-propoxyethyl, 3-oxobutanoate of 2-acetyloxyethyl, 3-oxobutanoate of 2-acryloyloxyethyl, 3-oxobutanoate of 2-methacryloyloxyethyl, propanedioate of 1-(2-hydroxyethyl)-3-methyl, propanedioate of 1-ethyl-3-(2-hydroxyethyl), propanedioate of 1,3-bis(2-hydroxyethyl), propanedioate of 1-(2-methoxyethyl)-3-methyl, propanedioate of 1-ethyl-3-(2-methoxyethyl), propanedioate of 1-(2-ethoxyethyl)-3-methyl and mono(2-hydroxyethyl) ester of propanedioic acid.

According to a variant, the content of element from group VIB is between 5 and 40% by weight that is expressed in terms of metal oxide from group VIB in relation to the total weight of the catalyst; the content of element from group VIII is between 1 and 10% by weight that is expressed in terms of metal oxide from group VIII in relation to the total weight of the catalyst.

According to a variant, the molar ratio of element from group VIII to element from group VIB in the catalyst is between 0.1 and 0.8.

According to a variant, the catalyst also contains phosphorus, with the phosphorus content being between 0.1 and 20% by weight that is expressed in terms of $P_2O_5$ in relation to the total weight of the catalyst, and the ratio of phosphorus to the element from group VIB in the catalyst is greater than or equal to 0.05.

According to a variant, the content of organic compound of formula (I) is between 1 and 45% by weight in relation to the total weight of the catalyst.

According to a variant, the catalyst also contains an organic compound other than the organic compound of formula (I) that contains oxygen and/or nitrogen and/or sulfur. According to this variant, this organic compound is preferably selected from among a compound that comprises one or more chemical groups selected from among the following groups: carboxylic, alcohol, thiol, thioether, sulfone, sulfoxide, ether, aldehyde, ketone, ester, carbonate, amine, nitrile, imide, oxime, urea and amide. Preferably, it is selected from among triethylene glycol, diethylene glycol, ethylene glycol, ethylenediaminetetraacetic acid (EDTA), maleic acid, malonic acid, citric acid, dimethylformamide, N-methylpyrrolidone, propylene carbonate, bicine, or tricine.

According to a variant, the catalyst is at least partially sulfurized.

The invention also relates to the method for preparation of said catalyst that comprises the following steps:
  a) at least one component of an element from group VIB, at least one component of an element from group VIII, an organic compound of formula (I), and optionally phosphorus are brought into contact with a substrate based on alumina or silica or silica-alumina, or a regenerated catalyst that contains a substrate based on alumina or silica or silica-alumina, at least one component of an element from group VIB, at least one component of an element from group VIII, and optionally phosphorus is brought into contact with an organic compound of formula (I), in such a way as to obtain a catalyst precursor,
  b) said catalyst precursor that is obtained from step a) is dried at a temperature that is lower than 200° C., without being calcined subsequently.

According to a variant, step a) is the next step:
  a') a substrate based on alumina or silica or silica-alumina is impregnated by at least one solution that contains at least one element from group VIB, at least one element from group VIII, an organic compound of formula (I), and optionally phosphorus in such a way as to obtain a catalyst precursor.

According to another variant, step a) comprises the following steps:
  a1) a substrate based on alumina or silica or silica-alumina is impregnated by at least one solution that contains at least one element from group VIB, at least one element from group VIII, and optionally phosphorus to obtain an impregnated substrate,
  a2) the impregnated substrate that is obtained in step a1) is dried at a temperature that is lower than 200° C. to obtain a dried impregnated substrate, and optionally the dried impregnated substrate is calcined to obtain a calcined impregnated substrate,
  a3) the dried and optionally calcined impregnated substrate that is obtained in step a2) is impregnated by an impregnation solution that comprises at least one organic compound of formula (I) in such a way as to obtain a catalyst precursor,
  a4) optionally, the catalyst precursor that is obtained in step a3) is allowed to mature.

According to another variant, step a) comprises the following steps:
  a1') a substrate that comprises at least one organic compound of formula (I) and optionally at least one part of phosphorus is prepared,
  a2') the substrate that is obtained in step a1') is impregnated by an impregnation solution that comprises at least one element from group VIB, at least one element from group VIII, and optionally phosphorus in such a way as to obtain a catalyst precursor,
  a3') optionally, the catalyst precursor that is obtained in step a2') is allowed to mature.

According to another variant, step a) comprises the following steps:

a1″) a solution that contains at least one element from group VIB, at least one element from group VIII, at least one organic compound that contains oxygen and/or nitrogen and/or sulfur, and optionally phosphorus is brought into contact by co-impregnation with a substrate based on alumina or silica or silica-alumina in such a way as to obtain an impregnated substrate, a2″) the impregnated substrate that is obtained from step a1″) is dried at a temperature that is lower than 200° C., without being calcined subsequently, to obtain a dried impregnated substrate, a3″) the dried impregnated substrate that is obtained from step a2″) is brought into contact with a solution of at least one organic compound that contains oxygen and/or nitrogen and/or sulfur that is identical to or different from the one that is used in step a1″) in such a way as to obtain a catalyst precursor, a4″) optionally, the catalyst precursor that is obtained in step a3″) is allowed to mature, and at least one of the organic compounds of step a1″) or of step a3″) is an organic compound of formula (I).

According to a variant, when it is desired to prepare the catalyst according to the invention starting from a regenerated catalyst, step a) of the method for preparation comprises the following steps:

a1‴) a regenerated catalyst that contains a substrate based on alumina or silica or silica-alumina, at least one component of an element from group VIB, at least one component of an element from group VIII, and optionally phosphorus is impregnated by an impregnation solution that comprises at least one organic compound of formula (I) in such a way as to obtain a catalyst precursor, a2‴) optionally, the catalyst precursor that is obtained in step a1‴) is allowed to mature.

According to a variant, the molar ratio of the organic compound of formula (I) to element(s) from group VIII is between 0.1 and 5.0 mol/mol.

The invention also relates to the use of the catalyst according to the invention or prepared according to the preparation method according to the invention in a method for hydrotreatment and/or hydrocracking of hydrocarbon fractions.

Below, the groups of chemical elements are provided according to the CAS classification (CRC Handbook of Chemistry and Physics, Editor CRC Press, Editor-in-Chief D. R. Lide, 81$^{st}$ Edition, 2000-2001). For example, group VIII according to the CAS classification corresponds to the metals of columns 8, 9 and 10 according to the new IUPAC classification.

Hydrotreatment is defined as reactions that encompass in particular hydrodesulfurization (HDS), hydrodenitrification (HDN), and the hydrogenation of aromatic compounds (HDA).

DETAILED DESCRIPTION OF THE INVENTION

Catalyst

The catalyst according to the invention is an additive catalyst with an organic compound. More particularly, the catalyst according to the invention comprises a substrate based on alumina or silica or silica-alumina, at least one element from group VIII, at least one element from group VIB, and an organic compound of formula (I).

The catalyst according to the invention can be a fresh catalyst, i.e., a catalyst that has not been used as catalyst previously in a catalytic unit and in particular in hydrotreatment and/or hydrocracking.

The catalyst according to the invention can also be a rejuvenated catalyst. A rejuvenated catalyst is defined as a catalyst that has been used as a catalyst in a catalytic unit and in particular in hydrotreatment and/or hydrocracking and that has been subjected to at least one calcination step so as to burn the coke (regeneration). This regenerated catalyst is then supplemented at least with one organic compound of formula (I) to obtain the rejuvenated catalyst. This rejuvenated catalyst can contain one or more other organic additive(s) that can be added before, after, or at the same time as the organic compound of formula (I).

The hydrogenating function of said catalyst, also called active phase, is ensured by at least one element from group VIB and by at least one element from group VIII.

The preferred elements from group VIB are molybdenum and tungsten. The preferred elements from group VIII are non-noble elements and in particular cobalt and nickel. Advantageously, the hydrogenating function is selected from the group that is formed by the following combinations of elements: cobalt-molybdenum, nickel-molybdenum, nickel-tungsten or nickel-cobalt-molybdenum, or nickel-molybdenum-tungsten.

In the case where significant hydrodesulfurization or hydrodenitrification and hydrogenation activity of aromatic compounds is desired, the hydrogenating function is advantageously ensured by the combination of nickel and molybdenum; a combination of nickel and tungsten in the presence of molybdenum can also be advantageous. In the case of feedstocks of vacuum distillate type or heavier, combinations of cobalt-nickel-molybdenum type can advantageously be used.

The total content of elements from group VIB and from group VIII is advantageously greater than 6% by weight that is expressed in terms of oxide in relation to the total weight of the catalyst.

The content of element from group VIB is between 5 and 40% by weight, preferably between 8 and 35% by weight, and in a more preferred manner between 10 and 30% by weight that is expressed in terms of metal oxide from group VIB in relation to the total weight of the catalyst.

The content of element from group VIII is between 1 and 10% by weight, preferably between 1.5 and 9% by weight, and in a more preferred manner between 2 and 8% by weight that is expressed in terms of metal oxide from group VIII in relation to the total weight of the catalyst.

The molar ratio of element from group VIII to element from group VIB in the catalyst is preferably between 0.1 and 0.8, preferably between 0.15 and 0.6, and in an even more preferred manner between 0.2 and 0.5.

The catalyst according to the invention advantageously also comprises phosphorus as dopant. The dopant is an added element that in itself does not have any catalytic nature but that increases the catalytic activity of the active phase.

The phosphorus content in said catalyst is preferably between 0.1 and 20% by weight that is expressed in terms of $P_2O_5$, preferably between 0.2 and 15% by weight that is expressed in terms of $P_2O_5$, and in a very preferred manner between 0.3 and 11% by weight that is expressed in terms of $P_2O_5$.

The molar ratio of phosphorus to the element from group VIB in the catalyst is greater than or equal to 0.05, preferably greater than or equal to 0.07, preferably between 0.08 and 1, preferably between 0.01 and 0.9, and in a very preferred manner between 0.15 and 0.8.

The catalyst according to the invention can advantageously also contain at least one dopant that is selected from among boron, fluorine, and a mixture of boron and fluorine.

When the catalyst contains boron, the boron content is preferably between 0.1 and 10% by weight that is expressed in terms of boron oxide, preferably between 0.2 and 7% by weight, and in a very preferred manner between 0.2 and 5% by weight.

When the catalyst contains fluorine, the fluorine content is preferably between 0.1 and and 10% by weight that is expressed in terms of fluorine, preferably between 0.2 and 7% by weight, and in a very preferred manner between 0.2 and 5% by weight.

When the catalyst contains boron and fluorine, the total content of boron and fluorine is preferably between 0.1 and 10% by weight that is expressed in terms of boron oxide and fluorine, preferably between 0.2 and 7% by weight, and in a very preferred manner between 0.2 and 5% by weight.

The catalyst according to the invention comprises a substrate based on alumina or silica or silica-alumina.

When the substrate of said catalyst is based on alumina, it contains more than 50% alumina, and, in a general way, it contains only the alumina or the silica-alumina as defined below.

Preferably, the substrate comprises alumina, and preferably extruded alumina. Preferably, the alumina is gamma-alumina.

The alumina substrate advantageously has a total pore volume of between 0.1 and 1.5 cm$^3$·g$^{-1}$, preferably between 0.4 and 1.1 cm$^3$·g$^{-1}$. The total pore volume is measured by mercury porosimetry according to the Standard ASTM D4284 with a wetting angle of 140°, as is described in the work Rouquerol, F.; Rouquerol, J.; Singh, K. "Adsorption by Powders & Porous Solids: Principle, Methodology and Applications," Academic Press, 1999, for example by means of an Autopore III™ model device of the trademark Micromeritics™.

The specific surface area of the alumina substrate is advantageously between 5 and 400 m$^2$·g$^{-1}$, preferably between 10 and 350 m$^2$·g$^{-1}$, in a more preferred manner between 40 and 350 m$^2$·g$^{-1}$. The specific surface area is determined in this invention by the B.E.T. method according to the Standard ASTM D3663, a method that is described in the same work cited above.

In another preferred case, the substrate of said catalyst is a silica-alumina that contains at least 50% by weight of alumina. The silica content in the substrate is at most 50% by weight, most often less than or equal to 45% by weight, preferably less than or equal to 40%.

The silicon sources are well known to one skilled in the art. It is possible to cite by way of example silicic acid, silica in powder form or in colloidal form (silica sol), tetraethyl orthosilicate Si(OEt)$_4$.

When the substrate of said catalyst is based on silica, it contains more than 50% by weight of silica and, in a general way, it contains only silica.

According to a particularly preferred variant, the substrate consists of alumina, silica, or silica-alumina.

The substrate can also advantageously contain in addition 0.1 to 50% by weight of zeolite. In this case, all of the zeolite sources and all of the associated preparation methods that are known to one skilled in the art can be incorporated.

Preferably, zeolite is selected from among the groups FAU, BEA, ISV, IWR, IWW, MEI, UWY, and in a preferred manner, zeolite is selected from between the groups FAU and BEA, such as the Y zeolite and/or beta-zeolite.

In certain particular cases, the substrate can also contain at least one part of metal(s) VIB and VIII, and/or at least one part of dopant(s), including phosphorus, and/or at least one part of the organic compound(s) containing oxygen (the organic compound of formula (I) or another) and/or nitrogen and/or sulfur, which have been introduced outside of impregnations (introduced, for example, during the preparation of the substrate).

The substrate advantageously comes in the form of balls, extrudates, pellets, or agglomerates that are irregular and non-spherical, whose specific shape may result from a crushing step.

The catalyst according to the invention also comprises an organic compound that corresponds to the following formula (I):

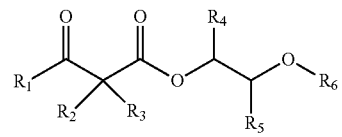

in which R1, R2, R3, R4 and R5 are selected from among a hydrogen atom, a hydroxyl radical, or a hydrocarbon radical that comprises from 1 to 12 carbon atoms that can also comprise at least one oxygen atom, and R6 is selected from among a hydrogen atom, a hydrocarbon radical that comprises from 1 to 12 carbon atoms that can also comprise at least one oxygen atom, a methacryloyl radical —C(O)C(CH$_2$)CH$_3$, an acryloyl radical —C(O)CHCH$_2$ or an acetyl radical —C(O)CH$_3$.

Preferably, R1, R2, R3, R4 and R5 are selected from between a hydrogen atom or a hydrocarbon radical that comprises from 1 to 12 carbon atoms that can also comprise at least one oxygen atom, and R6 is selected from among a hydrogen atom, a hydrocarbon radical that comprises from 1 to 12 carbon atoms that can also comprise at least one oxygen atom, a methacryloyl radical —C(O)C(CH$_2$)CH$_3$, an acryloyl radical —C(O)CHCH$_2$, or an acetyl radical —C(O)CH$_3$.

Preferably, R1, R2, R3, R4 and R5 are selected from between a hydrogen atom or a hydrocarbon radical that comprises from 1 to 4 carbon atoms, and R6 is selected from among a hydrogen atom, a hydrocarbon radical that comprises from 1 to 12 carbon atoms that can also comprise at least one oxygen atom, a methacryloyl radical —C(O)C(CH$_2$)CH$_3$, an acryloyl radical —C(O)CHCH$_2$, or an acetyl radical —C(O)CH$_3$.

Preferably, the organic compound is selected from among a derivative of the 3-oxobutanoates of 2-alkoxyethyl, in which R1 is a methyl group; R2, R3, R4 and R5 are hydrogen atoms, and R6 is selected from among a hydrogen atom, a hydrocarbon radical that comprises from 1 to 12 carbon atoms that can also comprise at least one oxygen atom, a methacryloyl radical —C(O)C(CH$_2$)CH$_3$, an acryloyl radical —C(O)CHCH$_2$, or an acetyl radical —C(O)CH$_3$.

The compound of formula (I) can be selected from among 2-methyl-3-oxopropanoate of 2-methoxyethyl, 2-methyl-3-oxopropanoate of 2-ethoxyethyl, 3-oxobutanoate of 2-hydroxyethyl, 3-oxobutanoate of 2-hydroxypropyl, 3-oxobutanoate of 2-methoxyethyl, 3-oxobutanoate of 2-ethoxyethyl, 3-oxobutanoate of 2-propoxyethyl, 3-oxobutanoate of 2-acetyloxyethyl, 3-oxobutanoate of 2-acryloyloxyethyl, 3-oxobutanoate of 2-methacryloyloxyethyl, propanedioate of 1-(2-hydroxyethyl)-3-methyl, propanedioate of 1-ethyl-3-(2-hydroxyethyl), propanedioate of 1,3-bis(2-hydroxyethyl), propanedioate of 1-(2-methoxyethyl)-3-methyl, propanedioate of 1-ethyl-3-(2-methoxyethyl), propanedioate of 1-(2-ethoxyethyl)-3-methyl and mono(2-hydroxyethyl) ester of propanedioic acid.

Preferably, the compound of formula (I) is selected from between 3-oxobutanoate of 2-methoxyethyl and 3-oxobutanoate of 2-methacryloyloxyethyl.

The 3-oxobutanoate of 2-methoxyethyl and the 3-oxobutanoate of 2-methacryloyloxyethyl correspond respectively to the following formulas (a) and (b) that are described below:

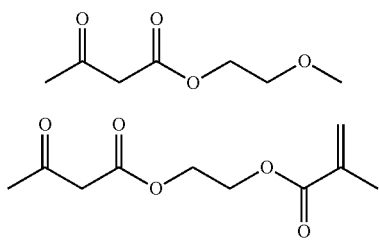

The presence of the organic compound of formula (I) on the catalyst makes it possible to observe an increased activity in relation to the non-additive catalysts and the additive dried catalysts that are known. The organic compound content of formula (I) on the catalyst according to the invention is between 1 and 45% by weight, preferably between 2 and 30% by weight, and in a more preferred manner between 3 and 25% by weight in relation to the total weight of the catalyst. During the preparation of the catalyst, the drying step(s) following the introduction of the organic compound of formula (I) is (are) carried out at a temperature that is lower than 200° C. in such a way as to preserve preferably at least 30%, preferably at least 50%, and in a very preferred manner at least 70%, of the amount of organic compound of formula (I) that is introduced calculated on the basis of the carbon remaining in the catalyst.

In addition to the organic compound of formula (I), the catalyst according to the invention can comprise another organic compound or a group of organic compounds that are known for their additive role. The function of additives is to increase the catalytic activity in relation to the non-additive catalysts. More particularly, the catalyst according to the invention can also comprise one or more organic compounds that contain oxygen other than the organic compound of formula (I) and/or one or more organic compounds that contain nitrogen and/or one or more organic compounds that contain sulfur. Preferably, the catalyst according to the invention can also comprise one or more organic compounds that contain oxygen other than the organic compound of formula (I) and/or one or more organic compounds that contain nitrogen. Preferably, the organic compound contains at least 2 carbon atoms and at least one oxygen and/or nitrogen atom.

Generally, the organic compound is selected from a compound that comprises one or more chemical groups selected from among the following groups: carboxylic, alcohol, thiol, thioether, sulfone, sulfoxide, ether, aldehyde, ketone, ester, carbonate, amine, nitrile, imide, oxime, urea and amide. Preferably, the organic compound is selected from a compound that comprises two alcohol groups and/or two carboxylic groups and/or two ester groups and/or at least one amide group.

The organic compound that contains oxygen can be one or more selected from among the compounds that comprise one or more chemical groups selected from among the following groups: carboxylic, alcohol, ether, aldehyde, ketone, ester, or carbonate. By way of example, the organic compound that contains oxygen can be one or more selected from the group that consists of ethylene glycol, diethylene glycol, triethylene glycol, a polyethylene glycol (with a molecular weight of between 200 and 1,500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, malic acid, oxalic acid, gluconic acid, tartaric acid, citric acid, a C1-C4 dialkyl succinate, methyl acetoacetate, ethyl acetoacetate, dibenzofuran, a crown ether, orthophthalic acid, glucose, and propylene carbonate.

The organic compound that contains nitrogen can be one or more selected from among the compounds that comprise one or more chemical groups selected from between an amine or nitrile group. By way of example, the organic compound that contains nitrogen can be one or more selected from the group that consists of ethylenediamine, diethylenetriamine, hexamethylenediamine, triethylenetetramine, tetraethylenepentamine, pentaethylenehexamine, acetonitrile, octylamine, guanidine, or a carbazole.

The organic compound that contains oxygen and nitrogen can be one or more that are selected from among the compounds that comprise one or more chemical groups that are selected from among the following groups: carboxylic acid, alcohol, ether, aldehyde, ketone, ester, carbonate, amine, nitrile, imide, urea, amide or oxime. By way of example, the organic compound that contains oxygen and nitrogen can be one or more selected from the group that consists of 1,2-cyclohexanediaminetetraacetic acid, monoethanolamine (MEA), N-methylpyrrolidone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethyl urea, glutamic acid, dimethylglyoxime, bicine or tricine, or else a lactam.

The organic compound that contains sulfur can be one or more selected from among the compounds that comprise one or more chemical groups from among the following groups: thiol, thioether, sulfone or sulfoxide. By way of example, the organic compound that contains sulfur can be one or more selected from the group that consists of thioglycolic acid, 2-hydroxy-4-methylthiobutanoic acid, a sulfonated derivative of a benzothiophene, or a sulfoxidated derivative of a benzothiophene.

Preferably, the organic compound contains oxygen; in a preferred manner, it is selected from among triethylene glycol, diethylene glycol, ethylene glycol, ethylenediaminetetraacetic acid (EDTA), maleic acid, malonic acid, citric acid, dimethylformamide, N-methylpyrrolidone, propylene carbonate, bicine, or tricine.

When it/they is/are present, the content of organic compound(s) with an additive group containing oxygen (other than the organic compound of formula (I)) and/or nitrogen and/or sulfur on the catalyst according to the invention is between 1 and 30% by weight, preferably between 1.5 and 25% by weight, and in a more preferred manner between 2 and 20% by weight in relation to the total weight of the catalyst.

Preparation Method

The catalyst according to the invention can be prepared according to any method for preparation of an additive substrate catalyst by an organic compound that is known to one skilled in the art.

The catalyst according to the invention can be prepared according to a preparation method that comprises the following steps:

a) at least one component of an element from group VIB, at least one component of an element from group VIII, an organic compound of formula (I), and optionally phosphorus are brought into contact with a substrate based on alumina or silica or silica-alumina, or a regenerated catalyst that contains a substrate based on alumina or silica or silica-alumina, at least one component of an element from group VIB, at least one component of an element from group VIII, and optionally phosphorus is brought into contact with an organic compound of formula (I), in such a way as to obtain a catalyst precursor, b) said catalyst precursor that is obtained from step a) is dried at a temperature that is lower than 200° C., without subsequently calcining it.

First, the method for preparation of a fresh catalyst will be described, and then subsequently, the method for preparation of a rejuvenated catalyst will be described.

Method for Preparation of a Fresh Catalyst

Step a) for bringing into contact comprises several implementations that are distinguished in particular by the times when the organic compound of formula (I) is introduced, which can be carried out either at the same time as the impregnation of the metals (co-impregnation), or after the impregnation of the metals (post-impregnation), or, finally, before the impregnation of the metals (pre-impregnation). In addition, the step for bringing into contact can combine at least two implementations, for example the co-impregnation and the post-impregnation. These different implementations will be described below. Each method, taken by itself or in combination, can take place in one or more steps.

It is important to emphasize that the catalyst according to the invention—during its preparation method—does not undergo calcination after the introduction of the organic compound of formula (I) or of any other organic compound that contains oxygen and/or nitrogen and/or sulfur so as to preserve at least in part the organic compound of formula (I) or any other organic compound in the catalyst. Here, calcination is defined as a heat treatment under a gas that contains air or oxygen at a temperature that is higher than or equal to 200° C.

However, the catalyst precursor can undergo a calcination step before the introduction of the organic compound of formula (I) or of any other organic compound that contains oxygen and/or nitrogen and/or sulfur, in particular after the impregnation of elements from groups VIB and VIII (post-impregnation) optionally in the presence of phosphorus and/or another dopant or during a regeneration of the catalyst that has already been used. The hydrogenating function that comprises the elements from group VIB and from group VIII of the catalyst according to the invention, also called active phase, is then found in oxide form.

According to another variant, the catalyst precursor does not undergo a calcination step after the impregnation of elements from groups VIB and VIII (post-impregnation); it is simply dried. The hydrogenating function, comprising the elements from group VIB and from group VIII of the catalyst according to the invention, also called active phase, is not then found in oxide form.

Regardless of the implementation, step a) for the bringing into contact generally comprises at least one impregnation step, preferably a dry impregnation step, in which the substrate is impregnated by an impregnation solution that comprises at least one element from group VIB, at least one element from group VIII, and optionally phosphorus. In the case of the co-impregnation described below in detail, this impregnation solution comprises in addition at least one organic compound of formula (I). The elements from group VIB and from group VIII are generally introduced by impregnation, preferably by dry impregnation, or by excess solution impregnation. Preferably, all of the elements from group VIB and from group VIII are introduced by impregnation, preferably by dry impregnation, regardless of the implementation.

The elements from group VIB and from group VIII can also be introduced in part during the shaping of said substrate at the time of mixing with at least one alumina gel selected as a matrix, with the rest of the hydrogenating elements then being subsequently introduced by impregnation. In a preferred manner, when the elements from group VIB and from group VIII are introduced in part at the time of mixing, the element proportion of group VIB that is introduced during this step is less than 5% by weight of the total element amount of group VIB introduced onto the final catalyst.

In a preferred manner, the element from group VIB is introduced at the same time as the element from group VIII, regardless of the method of introduction.

The molybdenum precursors that can be used are well known to one skilled in the art. For example, among the molybdenum sources, it is possible to use oxides and hydroxides, molybdic acids and the salts thereof, in particular the ammonium salts, such as ammonium molybdate, ammonium heptamolybdate, phosphomolybdic acid ($H_3PMo_{12}O_{40}$) and the salts thereof, and optionally silicomolybdic acid ($H_4SiMo_{12}O_{40}$) and the salts thereof. The molybdenum sources can also be heteropoly compounds of the following types: Keggin, lacunary Keggin, substituted Keggin, Dawson, Anderson, Strandberg, for example. Preferably used are molybdenum trioxide and heteropolyanions of the following types: Strandberg, Keggin, lacunary Keggin or substituted Keggin.

The tungsten precursors that can be used are also well known to one skilled in the art. For example, among the tungsten sources, it is possible to use oxides and hydroxides, tungstic acids and salts thereof, in particular ammonium salts, such as ammonium tungstate, ammonium metatungstate, phosphotungstic acid and salts thereof, and optionally silicotungstic acid ($H_4SiW_{12}O_{40}$) and salts thereof. The tungsten sources can also be heteropoly compounds of the following types: Keggin, lacunary Keggin, substituted Keggin, Dawson, for example. Preferably used are the oxides and salts of ammonium, such as ammonium metatungstate or the heteropolyanions of the following types: Keggin, lacunary Keggin or substituted Keggin.

The precursors of elements from group VIII that can be used are advantageously selected from among oxides, hydroxides, hydroxycarbonates, carbonates, and nitrates of the elements from group VIII; for example, nickel hydroxycarbonate, carbonate or cobalt hydroxide are used in a preferred manner.

Phosphorus, when it is present, can be introduced in its entirety or in part by impregnation. Preferably, it is introduced by impregnation, preferably dry, using a solution that contains precursors of the elements from group VIB and from group VIII.

Said phosphorus can advantageously be introduced by itself or in a mixture with at least one of the elements from group VIB and from group VIII, during any of the steps for impregnation of the hydrogenating function if the latter is introduced several times. Some or all of said phosphorus can also be introduced during the impregnation of the organic compound of formula (I) if the latter is introduced separately from the hydrogenating function (case of the post- and pre-impregnation described subsequently) in the presence or absence of an organic compound other than the organic compound of formula (I) that contains oxygen and/or nitrogen and/or sulfur. It can also be introduced upon synthesis of the substrate, at any step of the synthesis of the latter. It can thus be introduced before, during, or after the mixing of the selected alumina gel matrix, such as, for example and preferably, the aluminum oxyhydroxide (boehmite) precursor of alumina.

The preferred phosphorus precursor is the orthophosphoric acid $H_3PO_4$, but its salts and esters like the ammonium phosphates are also suitable. Phosphorus can also be introduced at the same time as the element(s) from group VIB in the form of heteropolyanions of the following types: Keggin, lacunary Keggin, substituted Keggin or Strandberg.

The organic compound of formula (I) is advantageously introduced into an impregnation solution that, according to the preparation method, can be the same solution or a solution that is different from the one that contains the elements from groups VIB and VIII in a total amount that corresponds:

to a molar ratio of the organic compound of formula (I) by element(s) from group VIB of the catalyst precursor of between 0.01 to 5 mol/mol, preferably between 0.05 to 3 mol/mol, in a preferred manner between 0.1 and 1.5 mol/mol, and in a very preferred manner between 0.2 and 1 mol/mol, calculated on the basis of components introduced into the impregnation solution(s), and to a molar ratio of the organic compound of formula (I) by element(s) from group VIII of the catalyst precursor of between 0.02 to 17 mol/mol, preferably between 0.1 to 10 mol/mol, in a preferred manner between 0.2 and 5 mol/mol, and in a very preferred manner between 0.4 and 3.5 mol/mol, calculated on the basis of components that are introduced into the impregnation solution(s).

Any impregnation solution that is described in this invention can comprise any polar solvent that is known to one skilled in the art. Said polar solvent that is used is advantageously selected from the group that is formed by methanol, ethanol, water, phenol, cyclohexanol, taken by themselves or in a mixture. Said polar solvent can also advantageously be selected from the group that is formed by propylene carbonate, DMSO (dimethyl sulfoxide), N-methylpyrrolidone (NMP) or sulfolane, taken by itself or in a mixture. In a preferred manner, a polar protic solvent is used. A list of customary polar solvents as well as their dielectric constant can be found in the book in "Solvents and Solvent Effects in Organic Chemistry," C. Reichardt, Wiley-VCH, 3rd Edition, 2003, pages 472-474. In a very preferred manner, the solvent that is used is water or ethanol, and in a particularly preferred manner, the solvent is water. In a possible embodiment, the solvent can be absent in the impregnation solution, in particular during a preparation of pre- or post-impregnation.

When the catalyst also comprises a dopant that is selected from among boron, fluorine, or a mixture of boron and fluorine, the introduction of this/these dopant(s) can be done in the same way as the introduction of phosphorus in various steps of the preparation and in various ways. Said dopant can advantageously be introduced by itself or in a mixture with at least one of the elements from group VIB and from group VIII during any of the steps for impregnation of the hydrogenating function if the latter is introduced several times. Some or all of said dopant can also be introduced during the impregnation of the organic compound of formula (I) if the latter is introduced separately from the hydrogenating function (case of the post- and pre-impregnation described subsequently), in the presence or absence of an organic compound other than the organic compound of formula (I) containing oxygen and/or nitrogen and/or sulfur. It can also be introduced upon the synthesis of the substrate at any step of the synthesis of the latter. It can thus be introduced before, during, or after the mixing of the selected alumina gel matrix, such as, for example and preferably, the aluminum oxyhydroxide (boehmite) precursor of the alumina.

Said dopant, when there is one of them, is advantageously introduced in a mixture with the precursor(s) of the elements from group VIB and from group VIII, some or all on the substrate shaped by dry impregnation of said substrate using a solution, preferably aqueous, that contains the precursors of metals, the precursor of phosphorus, and the precursor(s) of the dopant(s) (and also containing the organic compound of formula (I) in the co-impregnation mode).

The precursors of boron can be boric acid, orthoboric acid $H_3BO_3$, biborate or pentaborate of ammonium, boron oxide, boric esters. Boron can be introduced by, for example, a boric acid solution in a water/alcohol mixture or else in a water/ethanolamine mixture. Preferably, the precursor of boron, if boron is introduced, is orthoboric acid.

The precursors of fluorine that can be used are well known to one skilled in the art. For example, the fluoride anions can be introduced in the form of hydrofluoric acid or of its salts. These salts are formed with alkaline metals, ammonium, or an organic compound. In this last case, salt is advantageously formed in the reaction mixture by reaction between the organic compound and hydrofluoric acid. Fluorine can be introduced by, for example, impregnation of an aqueous solution of hydrofluoric acid or ammonium fluoride or else ammonium bifluoride.

When the catalyst also comprises a supplementary additive (in addition to the organic compound of formula (I)) or a group of supplementary additives that is selected from an organic compound other than the organic compound of formula (I) that contains oxygen and/or nitrogen and/or sulfur, the latter can be introduced into the impregnation solution of step a).

The molar ratio of (an) organic compound(s) containing oxygen and/or nitrogen and/or sulfur to element(s) from group VIB on the catalyst is between 0.05 to 5 mol/mol, preferably between 0.1 to 4 mol/mol, in a preferred manner between 0.2 and 3 mol/mol, calculated on the basis of components that are introduced into the impregnation solution(s).

The molar ratio of (an) organic compound(s) containing oxygen and/or nitrogen and/or sulfur to an organic compound of formula (I) is between 0.05 and 5 mol/mol, preferably between 0.1 and 4 mol/mol, in a preferred manner between 0.2 and 3 mol/mol, calculated on the basis of components that are introduced into the impregnation solution(s).

Advantageously, after each impregnation step, the impregnated substrate is allowed to mature. Maturation makes it possible for the impregnation solution to disperse in a homogeneous manner within the substrate.

Any maturation step that is described in this invention is advantageously carried out at atmospheric pressure, under a water-saturated atmosphere and at a temperature of between 17° C. and 50° C., and preferably at ambient temperature. Generally, a maturation period of between 10 minutes and 48 hours, and preferably between 30 minutes and 5 hours, is adequate. Longer periods are not ruled out but do not necessarily provide an improvement.

In accordance with step b) of the preparation method according to the invention, the catalyst precursor that is obtained in step a) and that is optionally matured is subjected to a drying step at a temperature that is lower than 200° C. without a subsequent calcination step.

Any drying step following the introduction of the organic compound of formula (I) that is described in this invention is carried out at a temperature that is lower than 200° C., preferably between 50 and 180° C., in a preferred manner between 70 and 150° C., and in a very preferred manner between 75 and 130° C.

The drying step is advantageously carried out by any technique that is known to one skilled in the art. It is advantageously carried out at atmospheric pressure or at reduced pressure. In a preferred manner, this step is carried out at atmospheric pressure. It is advantageously carried out in a flushed bed by using air or any other hot gas. In a preferred manner, when the drying is carried out in a fixed bed, the gas that is used is either air or an inert gas such as argon or nitrogen. In a very preferred manner, the drying is carried out in a flushed bed in the presence of nitrogen and/or air. Preferably, the drying step has a short duration of between 5 minutes and 4 hours, preferably between 30 minutes and 4 hours, and in a very preferred manner between 1 hour and 3 hours. The drying is then conducted in such a way as preferably to preserve at least 30% of the organic compound of formula (I) that is introduced during the impregnation step; preferably, this amount is greater than 50%, and in an even more preferred manner greater than 70%, calculated on the basis of the carbon that remains on the catalyst. When an organic compound other than the organic compound of formula (I) that contains oxygen and/or nitrogen and/or sulfur is present, the drying step is carried out in such a way as preferably to preserve at least 30%, preferably at least 50%, and in a very preferred manner at least 70% of the amount that is introduced, calculated on the basis of the carbon that remains on the catalyst.

At the end of the drying step b), a dried catalyst that has not undergone any subsequent calcination step is obtained.

Co-Impregnation

According to a first implementation of step a) of the method for preparation of the (fresh) catalyst, deposition of said components of the elements from group VIB, from group VIII, of the organic compound of formula (I), and optionally phosphorus is initiated on said substrate by one or more co-impregnation steps; i.e., said components of the elements from group VIB, from group VIII, the organic compound of formula (I), and optionally phosphorus are introduced simultaneously into said substrate ("co-impregnation"). According to a variant, step a) is the next step:

a') a substrate based on alumina or silica or silica-alumina is impregnated by at least one solution that contains at least one element from group VIB, at least one element from group VIII, the organic compound of formula (I), and optionally phosphorus in such a way as to obtain a catalyst precursor.

The co-impregnation step(s) is (are) carried out preferably by dry impregnation or by excess solution impregnation. When this first mode comprises the implementation of several co-impregnation steps, each co-impregnation step is preferably followed by a step for intermediate drying at a temperature that is lower than 200° C., advantageously between 50 and 180° C., preferably between 70 and 150° C., in a very preferred manner between 75 and 130° C., and optionally a maturation period has been observed between impregnation and drying.

In a very preferred manner, during preparation via co-impregnation, the elements from group VIB and from group VIII, the organic compound of formula (I), optionally phosphorus, optionally another dopant that is selected from between boron and/or fluorine, and optionally an organic compound other than the organic compound of formula (I) that contains oxygen and/or nitrogen and/or sulfur are introduced into step a) in their entirety after the shaping of said substrate, by a dry impregnation of said substrate using an aqueous impregnation solution that contains the precursors of elements from group VIB and from group VIII, the organic compound of formula (I), optionally the phosphorus precursor, optionally the dopant precursor that is selected from between boron and/or fluorine, and optionally the organic compound other than the organic compound of formula (I) that contains oxygen and/or nitrogen and/or sulfur.

Post-Impregnation

According to a second implementation of step a) of the method for preparation of (fresh) catalyst according to the invention, at least one organic compound of formula (I) is brought into contact with a dried and optionally calcined impregnated substrate that comprises at least one component of an element from group VIB, at least one component of an element from group VIII, and optionally phosphorus, with said substrate being based on alumina or silica or silica-alumina, in such a way as to obtain a catalyst precursor.

This second implementation is a preparation by "post-impregnation" of the organic compound of formula (I). The latter is carried out by, for example, dry impregnation.

According to this second implementation, bringing into contact according to step a) comprises the following successive steps that will be presented in detail below:

a1) a substrate based on alumina or silica or silica-alumina is impregnated by at least one solution that contains at least one element from group VIB, at least one element from group VIII, and optionally phosphorus to obtain an impregnated substrate, a2) the impregnated substrate that is obtained in step a1) at a temperature that is lower than 200° C. is dried to obtain a dried impregnated substrate, and, optionally, the dried impregnated substrate is calcined to obtain a calcined impregnated substrate, a3) the dried and optionally calcined impregnated substrate that is obtained in step a2) is impregnated by an impregnation solution that comprises at least the organic compound of formula (I) in such a way as to obtain a catalyst precursor, a4) optionally, the catalyst precursor that is obtained in step a3) is allowed to mature.

In step a1) of the implementation by post-impregnation, the introduction of the elements from group VIB and from group VIII and optionally phosphorus onto the substrate can advantageously be carried out by one or more excess solution impregnations on the substrate, or preferably by one or more dry impregnations, and in a preferred manner, by a single dry impregnation of said substrate, using (a) preferably aqueous solution(s) containing the precursor(s) of the metals and preferably the phosphorus precursor.

When several impregnation steps are carried out, each impregnation step is preferably followed by an intermediate drying step at a temperature that is lower than 200° C., advantageously between 50 and 180° C., preferably between 70 and 150° C., in a very preferred manner between 75 and 130° C.; and optionally a maturation period has been observed between impregnation and drying. Each intermediate drying step, prior to the introduction of the organic compound of formula (I), can be followed by a calcination step under the conditions that are described below for step a2).

In a very preferred manner, during the preparation via post-impregnation, the elements from group VIB and from group VIII, and optionally phosphorus, optionally another dopant that is selected from between boron and/or fluorine, and optionally an organic compound other than the organic compound of formula (I) that contains oxygen and/or nitrogen and/or sulfur are introduced in step a1) in their entirety after the shaping of said substrate, by a dry impregnation of said substrate using an aqueous impregnation solution that contains the precursors of elements from group VIB and from group VIII, the phosphorus precursor, and optionally the dopant precursor that is selected from between boron and/or fluorine, and optionally the organic compound other than the organic compound of formula (I) that contains oxygen and/or nitrogen and/or sulfur.

According to another variant, the elements from group VIB and from group VIII and optionally phosphorus, optionally another dopant that is selected from between boron and/or fluorine, and optionally an organic compound other than the organic compound of formula (I) that contains oxygen and/or nitrogen and/or sulfur can be introduced into step a1) in a sequential way by several impregnation solutions that contain one or more of the components.

Advantageously, the impregnated substrate that is obtained in step a1) is allowed to mature under the conditions that are described for the maturation above.

According to step a2), the impregnated substrate that is obtained in step a1) is dried at a temperature that is lower than 200° C. in order to obtain a dried impregnated substrate under the conditions that are described for the drying above.

Optionally, the dried impregnated substrate can then undergo calcination. Calcination is generally carried out at a temperature of between 200° C. and 900° C., preferably between 250° C. and 750° C. The calcination period is generally between 0.5 hour and 16 hours, preferably between 1 hour and 5 hours. It is generally carried out in air. Calcination makes it possible to transform the precursors of metals from groups VIB and VIII into oxides.

According to step a3), the dried impregnated substrate that is obtained in step a2) is impregnated by an impregnation solution that comprises at least the organic compound of formula (I) in such a way as to obtain a catalyst precursor.

The organic compound of formula (I) can advantageously be deposited in one or more steps either by excess impregnation, or by dry impregnation, or by any other means that is known to one skilled in the art. Preferably, the organic compound of formula (I) is introduced by dry impregnation, in the presence or absence of a solvent as described above.

Preferably, the solvent in the impregnation solution that is used in step a3) is water, which facilitates the implementation on the industrial scale.

The organic compound of formula (I) is advantageously introduced into the impregnation solution of step a3) with the molar ratios to elements from group VIB or from group VIII that are described above.

When it is desired also to introduce an additional additive (in addition to the organic compound of formula (I)) or a group of additional additives selected from an organic compound that contains oxygen and/or nitrogen and/or sulfur, the latter can be introduced into the impregnation solution of step a1) and/or into the impregnation solution of step a3) or else by an additional impregnation step at any moment of the preparation method before the final drying of step b), it being understood that the calcination step is not carried out after its introduction. This compound is introduced in the proportions that are described above.

According to step a4), the catalyst precursor that is obtained in step a3) is optionally allowed to mature under the maturation conditions described above.

In accordance with step b) of the preparation method according to the invention, the catalyst precursor that has optionally been matured during step a4) is subjected to a drying step at a temperature that is lower than 200° C. without a subsequent calcination step, as described above.

Pre-Impregnation

According to a third implementation of step a) of the method for preparation of the (fresh) catalyst according to the invention, at least one component of an element from group VIB, at least one component of an element from group VIII, and optionally phosphorus are brought into contact with the substrate based on alumina or silica or silica-alumina, which contains an organic compound of formula (I) in such a way as to obtain a catalyst precursor.

This third implementation is a preparation by "pre-impregnation" of the organic compound of formula (I). The latter is carried out by, for example, dry impregnation.

According to this third implementation, bringing into contact according to step a) comprises the following successive steps that will be presented in detail below:

a1') a substrate that comprises at least one organic compound of formula (I) and optionally at least one part of phosphorus is prepared, a2') the substrate that is obtained in step a1') is impregnated by an impregnation solution that comprises at least one element from group VIB, at least one element from group VIII, and optionally phosphorus in such a way as to obtain a catalyst precursor, a3') optionally, the catalyst precursor that is obtained in step a2') is allowed to mature.

In step a1') of the implementation by pre-impregnation, a substrate that comprises at least one organic compound of formula (I) and optionally at least one part of phosphorus is prepared. The organic compound of formula (I) can be introduced at any time in the preparation of the substrate, and in a preferred manner during the shaping or by impregnation on an already formed substrate.

If the introduction of the organic compound of formula (I) on the previously shaped substrate is selected, the latter can then be carried out as is indicated for step a3) of the post-impregnation. It will then be followed by an optional step for maturation and for drying at a temperature that is lower than 200° C. under the maturation and drying conditions as described above.

If the introduction during the shaping is selected, preferably, said shaping is carried out by mixing-extrusion, by pelletization, by the drop coagulation method (oil-drop according to English terminology), by turntable granulation or by any other method that is well known to one skilled in the art. In a very preferred manner, said shaping is carried out by mixing-extrusion, with the organic compound of formula (I) being able to be introduced at any time in the mixing-extrusion. The formed material that is obtained at the end of the shaping step then advantageously undergoes a heat treatment step at a temperature such that at least one part of the organic compound of formula (I) remains present.

The same holds true for the phosphorus that is optionally present in said substrate of step a1'). Phosphorus can be introduced at any time in the preparation of the substrate, and in a preferred manner during the shaping or by impregnation on an already formed substrate as described above. If the phosphorus is introduced by itself in the shaping, i.e., without the organic compound of formula (I) itself then introduced by impregnation, the calcination temperature following its introduction can then advantageously be produced at a temperature that is lower than 1,000° C.

In step a2') of the implementation by pre-impregnation, the introduction of elements from group VIB and from group VIII and optionally phosphorus can advantageously be carried out by one or more excess solution impregnations on the substrate, or preferably by one or more dry impregnations, and, in a preferred manner, by a single dry impregnation of said substrate, using (a) preferably aqueous solution(s) containing the metal precursor(s) and optionally the phosphorus precursor.

Advantageously, the catalyst precursor that is obtained in step a2') is allowed to mature under the maturation conditions described above.

When it is also desired to introduce an additional additive (in addition to the organic compound of formula (I)) or a group of additional additives that is selected from an organic compound that contains oxygen and/or nitrogen and/or sulfur, the latter can be introduced into the substrate of step a1') during the shaping or by impregnation, and/or into the impregnation solution of step a2') or else by an additional impregnation step at any time in the preparation method before the final drying of step b), it being understood that the calcination step is not carried out after its introduction.

The three modes described above can be implemented by themselves as described or mixed to create other hybrid preparation methods based on technical and practical constraints.

According to another alternative embodiment, bringing into contact according to step a) combines at least two modes for bringing into contact, for example the co-impregnation of an organic compound and the post-impregnation of an organic compound that can be identical to or different from the one that is used for co-impregnation, since at least one of the organic compounds is an organic compound of formula (I).

According to this alternative implementation, bringing into contact according to step a) comprises the following successive steps:
  a1") a solution that contains at least one element from group VIB, at least one element from group VIII, at least one organic compound that contains oxygen and/or nitrogen and/or sulfur, and optionally phosphorus is brought into contact by co-impregnation with a substrate based on alumina or silica or silica-alumina in such a way as to obtain an impregnated substrate,
  a2") the impregnated substrate that is obtained from step a1") is dried at a temperature that is lower than 200° C., without being calcined subsequently, to obtain a dried impregnated substrate,
  a3") the dried impregnated substrate that is obtained from step a2") is brought into contact with a solution of at least one organic compound that contains oxygen and/or nitrogen and/or sulfur that is identical to or different from the one that is used in step a1") in such a way as to obtain a catalyst precursor,
  a4") optionally, the catalyst precursor that is obtained in step a3") is allowed to mature,
and at least one of the organic compounds of step a1") or of step a3") is an organic compound of formula (I).

The operating conditions that are described above can be applied, of course, within the framework of this last embodiment.

Method for Preparation of a Rejuvenated Catalyst

The catalyst according to the invention can be a rejuvenated catalyst. This catalyst can be prepared according to the preparation method that comprises the following steps:
  a) a regenerated catalyst that contains a substrate based on alumina or silica or silica-alumina, at least one component of an element from group VIB, at least one component of an element from group VIII, and optionally phosphorus is brought into contact with an organic compound of formula (I) in such a way as to obtain a catalyst precursor,
  b) said catalyst precursor that is obtained from step a) is dried at a temperature that is lower than 200° C., without being calcined subsequently.

According to step a), a regenerated catalyst is brought into contact with an organic compound of formula (I), in such a way as to obtain a catalyst precursor. The regenerated catalyst is a catalyst that has been used as a catalyst in a catalytic unit and in particular in hydrotreatment and/or hydrocracking and that has been subjected to at least one calcination step, so as to burn the coke (regeneration). Regeneration makes possible the combustion of carbon that is deposited on the catalyst during its industrial use. It can be carried out by any means known to one skilled in the art. Regeneration is in general carried out at temperatures of between 350 and 550° C., and most often between 400 and 520° C., or between 420 and 520° C., or else between 450 and 520° C., with temperatures that are lower than 500° C. often being advantageous.

The regenerated catalyst contains a substrate based on alumina or silica or silica-alumina, at least one component of an element from group VIB, at least one component of an element from group VIII, and optionally phosphorus in the respective proportions indicated above. Following regeneration (calcination step), the hydrogenating function that comprises the elements from group VIB and from group VIII of the regenerated catalyst is in oxide form. It can also contain dopants other than phosphorus, as described above.

According to this implementation, bringing into contact according to step a) comprises the following successive steps:
  a1''') a regenerated catalyst that contains a substrate based on alumina or silica or silica-alumina, at least one component of an element from group VIB, at least one component of an element from group VIII, and optionally phosphorus is impregnated by an impregnation solution that comprises at least one organic compound of formula (I) in such a way as to obtain a catalyst precursor,
  a2''') optionally, the catalyst precursor that is obtained in step a1''') is allowed to mature.

Preferably, the bringing into contact of step a) is carried out by impregnation of the regenerated catalyst by an impregnation solution that comprises at least one organic compound of formula (I) in such a way as to obtain a catalyst precursor.

The organic compound of formula (I) can advantageously be deposited in one or more steps either by excess impregnation, or by dry impregnation, or by any other means that is known to one skilled in the art. Preferably, the organic compound of formula (I) is introduced by dry impregnation, in the presence or absence of a solvent as described above.

Preferably, the solvent in the impregnation solution that is used is water, which facilitates implementation on the industrial scale.

The organic compound of formula (I) is advantageously introduced into the impregnation solution with the molar ratios to the element from group VIB or from group VIII described above.

When it is also desired to introduce an additional additive (in addition to the organic compound of formula (I)) or a group of additional additives selected from an organic compound that contains oxygen and/or nitrogen and/or sulfur, the latter can be introduced into the impregnation solution of step a1''') or else by an additional impregnation step at any time of the preparation method before the final drying of step b), it being understood that a calcination step is not carried out after the introduction thereof. This compound is introduced in the proportions described above.

According to step a2'''), the catalyst precursor that is obtained in step a1''') is optionally allowed to mature under the maturation conditions described above.

In accordance with step b) of the preparation method according to the invention, the catalyst precursor that has optionally matured during step a2''') is subjected to a drying step at a temperature that is lower than 200° C. without a subsequent calcination step, as described above.

Sulfurization

Before it is used for the hydrotreatment and/or hydrocracking reaction, it is advantageous to transform the dried catalyst that is obtained according to any one of the introduction methods described in this invention into a sulfurized catalyst so as to form its active radical. This step of activation or sulfurization is carried out by methods that are well known to one skilled in the art and advantageously under a sulfo-reducing atmosphere in the presence of hydrogen and hydrogen sulfide.

At the end of step b) according to the various preparation modes of the method according to the invention, said catalyst that is obtained is therefore advantageously subjected to a sulfurization step, without an intermediate calcination step.

Said dried catalyst is advantageously sulfurized in an ex situ or in situ manner. The sulfurizing agents are the gas $H_2S$ or any other compound that contains sulfur that is used for the activation of hydrocarbon feedstocks for the purpose of sulfurizing the catalyst. Said compounds that contain sulfur are advantageously selected from among the alkyl disulfides, such as, for example, dimethyl disulfide (DMDS); alkyl sulfides, such as, for example, dimethyl sulfide; thiols, such as, for example, n-butylmercaptan (or 1-butanethiol); polysulfide compounds, such as tert-nonyl polysulfide; or any other compound that is known to one skilled in the art that makes it possible to obtain a good sulfurization of the catalyst. In a preferred manner, the catalyst is sulfurized in situ in the presence of a sulfurizing agent and a hydrocarbon feedstock. In a very preferred manner, the catalyst is sulfurized in situ in the presence of an additive hydrocarbon feedstock of dimethyl disulfide.

Method for Hydrotreatment and/or Hydrocracking

Finally, another object of the invention is the use of the catalyst according to the invention or prepared according to the preparation method according to the invention in methods for hydrotreating and/or hydrocracking hydrocarbon fractions.

The catalyst according to the invention and that preferably previously underwent a sulfurization step is advantageously used for the reactions for hydrotreatment and/or hydrocracking of hydrocarbon feedstocks, such as petroleum fractions, fractions obtained from carbon, or hydrocarbons produced from natural gas, optionally in mixtures or else from a hydrocarbon fraction that is obtained from the biomass and more particularly for the following reactions: hydrogenation, hydrodenitration, hydrodearomatization, hydrodesulfurization, hydrodeoxygenation, hydrodemetallization or hydroconversion of hydrocarbon feedstocks.

In these uses, the catalyst according to the invention and that preferably has previously undergone a sulfurization step has improved activity in relation to the catalysts of the prior art. This catalyst can also advantageously be used during the pretreatment of feedstocks of catalytic cracking or hydrocracking, or the hydrodesulfurization of residues or the intense hydrodesulfurization of diesel fuels (ULSD Ultra Low Sulfur Diesel according to English terminology).

The feedstocks that are used in the hydrotreatment method are, for example, gasolines, diesel fuels, vacuum diesel fuels, atmospheric residues, vacuum residues, atmospheric distillates, vacuum distillates, heavy fuels, oils, waxes and paraffins, waste oils, deasphalted crudes or residues, feedstocks that are obtained from thermal or catalytic conversion methods, lignocellulosic feedstocks or more generally feedstocks issued from the biomass, taken by themselves or in a mixture. The feedstocks that are treated, and in particular those cited above, generally contain heteroatoms, such as sulfur, oxygen, and nitrogen, and, for the heavy feedstocks, they most often also contain metals.

The operating conditions that are used in the methods implementing the reactions for hydrotreatment of hydrocarbon feedstocks described above are generally as follows: the temperature is advantageously between 180 and 450° C., and preferably between 250 and 440°; the pressure is advantageously between 0.5 and 30 MPa, and preferably between 1 and 18 MPa; the hourly volumetric flow rate is advantageously between 0.1 and 20 $h^{-1}$, and preferably between 0.2 and 5 $h^{-1}$; and the hydrogen/feedstock ratio that is expressed in terms of volume of hydrogen, measured under normal conditions of temperature and pressure, to the volume of liquid feedstock is advantageously between 50 l/l to 5,000 l/l, and preferably 80 to 2,000 l/l.

According to a first mode of use, said hydrotreatment method according to the invention is a method for hydrotreatment and in particular hydrodesulfurization (HDS) of a diesel fuel fraction that is produced in the presence of at least one catalyst according to the invention. The object of said hydrotreatment method according to the invention is to eliminate the sulfur-containing compounds that are present in said diesel fuel fraction so as to reach the environmental standards that are in force, namely a sulfur content that is allowed up to 10 ppm. It also makes it possible to reduce the contents of aromatic compounds and nitrogen in the diesel fuel fraction that is to be hydrotreated.

Said diesel fuel fraction that is to be hydrotreated according to the method of the invention contains from 0.02 to 5.0% by weight of sulfur. It is advantageously obtained from the direct distillation (or straight run diesel fuel according to English terminology), from a coking unit (coking according to English terminology), from a viscoreduction unit (visbreaking according to English terminology), from a steam-cracking unit (steam cracking according to English terminology), from a unit for hydrotreatment and/or hydrocracking of heavier feedstocks and/or a catalytic cracking unit (Fluid Catalytic Cracking according to English terminology). Said diesel fuel fraction preferably has at least 90% of the compounds whose boiling point is between 250° C. and 400° C. at atmospheric pressure.

The method for hydrotreatment of said diesel fuel fraction according to the invention is implemented under the following operating conditions: a temperature of between 200 and 400° C., preferably between 300 and 380° C.; a total pressure of between 2 MPa and 10 MPa, and more preferably between 3 MPa and 8 MPa; with a ratio of hydrogen volume to volume of hydrocarbon feedstock, expressed in terms of hydrogen volume, measured under the normal conditions of temperature and pressure, to volume of liquid feedstock, of between 100 and 600 liters per liter and more preferably between 200 and 400 liters per liter; and an hourly volumetric flow rate of between 1 and 10 $h^{-1}$, preferably between 2 and 8 $h^{-1}$. The VVH corresponds to the inverse of the contact time that is expressed in hours and is defined by the ratio of the volumetric flow rate of liquid hydrocarbon feedstock to the volume of charged catalyst in the reaction unit that implements the hydrotreatment method according to the invention. The reaction unit that implements the method for hydrotreatment of said diesel fuel fraction according to the invention is preferably operated in a fixed bed, in a moving bed, or in a boiling bed, preferably in a fixed bed.

According to a second mode of use, said method for hydrotreatment and/or hydrocracking according to the invention is a hydrotreatment method (in particular hydrodesulfurization, hydrodenitrification, hydrogenation of aromatic compounds) and/or hydrocracking of a vacuum distillate fraction produced in the presence of at least one catalyst according to the invention. If appropriate, the object of said hydrotreatment and/or hydrocracking method, otherwise called hydrocracking pretreatment method or hydrocracking according to the invention, is to eliminate the sulfur-containing, nitrogen-containing, or aromatic compounds that are present in said distillate fraction in such a way as to carry out a pretreatment before conversion in methods for catalytic cracking or hydroconversion, or to hydrocrack the distillate fraction that would optionally previously have been pretreated if necessary.

Highly varied feedstocks can be treated by the methods for hydrotreatment and/or hydrocracking of vacuum distillates described above. Generally, they contain at least 20% by volume and often at least 80% by volume of compounds that boil above 340° C. at atmospheric pressure. The feedstock can be, for example, vacuum distillates as well as feedstocks that come from units for extraction of aromatic compounds from lubricating oil bases or obtained from dewaxing with solvent from lubricating oil bases, and/or deasphalted oils, or else the feedstock can be a deasphalted oil or paraffins obtained from the Fischer-Tropsch method or else any mixture of the feedstocks cited above. In general, the feedstocks have a boiling point T5 of higher than 340° C. at atmospheric pressure, and even better higher than 370° C. at atmospheric pressure; i.e., 95% of the compounds that are present in the feedstock have a boiling point higher than 340° C., and even better higher than 370° C. The nitrogen content of the feedstocks that are treated in the methods according to the invention is usually greater than 200 ppm by weight, preferably between 500 and 10,000 ppm by weight. The sulfur content of the feedstocks that are treated in the methods according to the invention is usually between 0.01 and 5.0% by weight. The feedstock can optionally contain metals (for example, nickel and vanadium). The asphaltene content is generally less than 3,000 ppm by weight.

The hydrotreatment and/or hydrocracking catalyst is generally brought into contact, in the presence of hydrogen, with the feedstocks described above, at a temperature of higher than 200° C., often between 250° C. and 480° C., advantageously between 320° C. and 450° C., preferably between 330° C. and 435° C.; under a pressure of higher than 1 MPa, often between 2 and 25 MPa, in a preferred manner between 3 and 20 MPa; with the volumetric flow rate being between 0.1 and 20.0 $h^{-1}$ and preferably 0.1-6.0 $h^{-1}$, preferably 0.2-3.0 $h^{-1}$; and the amount of hydrogen introduced is such that the volumetric ratio of liter of hydrogen/liter of hydrocarbon, expressed in terms of hydrogen volume, measured under the normal conditions of temperature and pressure, to volume of liquid feedstock, is between 80 and 5,000 l/l and most often between 100 and 2,000 l/l. These operating conditions that are used in the methods according to the invention generally make it possible to reach conversions per pass into products that have boiling points of lower than 340° C. at atmospheric pressure, and even lower than 370° C. at atmospheric pressure, higher than 15%, and in an even more preferred manner between 20 and 95%.

The methods for hydrotreatment and/or hydrocracking of vacuum distillates that implement catalysts according to the invention cover the fields of pressure and conversion ranging from soft hydrocracking to high-pressure hydrocracking. Soft hydrocracking is defined as hydrocracking that leads to moderate conversions, generally less than 40%, and operating at low pressure, generally between 2 MPa and 6 MPa.

The catalyst according to the invention can be used by itself, in one or more catalytic beds, in a fixed bed, in one or more reactors, in a so-called one-step hydrocracking scheme, with or without liquid recycling of the unconverted fraction, or else in a so-called two-step hydrocracking scheme, optionally combined with a hydrorefining catalyst that is located upstream from the catalyst of this invention.

In a third mode of use, said hydrotreatment and/or hydrocracking method according to the invention is advantageously implemented as pretreatment in a fluidized-bed catalytic cracking method (or FCC method for Fluid Catalytic Cracking according to English terminology). The operating conditions of the pretreatment in terms of range of temperature, pressure, hydrogen recycling rate, hourly volumetric flow rate are generally identical to those described above for the methods for hydrotreatment and/or hydrocracking of vacuum distillates. The FCC method can be executed in a conventional manner that is known to ones skilled in the art under adequate cracking conditions for the purpose of producing hydrocarbon products of lower molecular weight. A summary description of catalytic cracking will be found in, for example, ULLMANS ENCYCLOPEDIA OF INDUSTRIAL CHEMISTRY, VOLUME A 18, 1991, pages 61 to 64.

According to a fourth mode of use, said hydrotreatment and/or hydrocracking method according to the invention is a method for hydrotreatment (in particular hydrodesulfurization) of a gasoline fraction in the presence of at least one catalyst according to the invention.

In contrast to other hydrotreatment methods, the hydrotreatment (in particular the hydrodesulfurization) of gasolines is supposed to make it possible to meet two competing constraints: to ensure a deep hydrodesulfurization of gasolines and to limit the hydrogenation of unsaturated compounds that are present so as to limit the octane number loss.

The feedstock is generally a hydrocarbon fraction that has a distillation interval of between 30 and 260° C. Preferably, this hydrocarbon fraction is a gasoline-type fraction. In a very preferred manner, the gasoline fraction is an olefinic gasoline fraction that is obtained from, for example, a catalytic cracking unit (Fluid Catalytic Cracking according to the English terminology).

The hydrotreatment method consists in bringing the hydrocarbon fraction into contact with the catalyst according to the invention and hydrogen under the following conditions: at a temperature of between 200 and 400° C., preferably between 230 and 330° C.; at a total pressure of between 1 and 3 MPa, preferably between 1.5 and 2.5 MPa; at an hourly volumetric flow rate (VVH), defined as being the volumetric flow rate of feedstock relative to the catalyst volume, of between 1 and 10 $h^{-1}$, preferably between 2 and 6 $h^{-1}$; and with a gasoline feedstock/hydrogen volumetric ratio of between 100 and 600 Nl/l, preferably between 200 and 400 Nl/l.

The method for hydrotreatment of gasolines can be carried out in one or more fixed-bed-type or boiling-bed-type reactors arranged in series. If the method is implemented by means of at least two reactors arranged in series, it is possible to provide a device for eliminating $H_2S$ from the effluent that is obtained from the first hydrodesulfurization reactor before treating said effluent in the second hydrodesulfurization reactor.

The following examples demonstrate the significant increase in activity on the catalysts that are prepared according to the method according to the invention in relation to the catalysts of the prior art and explain the invention without, however, limiting its scope.

EXAMPLES

Example 1: Preparation of CoMoP Catalysts on Alumina without C1 and C2 Organic Compounds (Non-Compliant with the Invention)

Cobalt, molybdenum, and phosphorus are added to an alumina substrate that has a BET surface area of 230 $m^2/g$, a pore volume that is obtained by mercury porosimetry of 0.78 ml/g, and a mean pore diameter of 11.5 nm that is defined as the median volume diameter by mercury porosimetry and that comes in "extruded" form. The impregnation solution is prepared by dissolution at 90° C. of molybdenum oxide (21.1 g) and cobalt hydroxide (5.04 g) in 11.8 g of an aqueous solution of 85% phosphoric acid and water. After dry impregnation, the extrudates are allowed to mature under a water-saturated atmosphere for 24 hours at ambient temperature, and then they are dried at 90° C. for 16 hours. The thus obtained dried catalytic precursor is denoted C1. Calcination of the C1 catalytic precursor at 450° C. for 2 hours results in the C2 calcined catalyst. The final composition of the C1 and C2 catalysts that is expressed in the form of oxides and relative to the dry catalyst mass is then as follows: $MoO_3$=19.5±0.2% by weight, CoO=3.8±0.1% by weight, and $P_2O_5$=6.7±0.1% by weight.

Example 2: Preparation of the CoMoP Catalysts on C3 Alumina (not Compliant with the Invention), C4 Alumina (Compliant with the Invention) by Co-Impregnation Cobalt, molybdenum, and phosphorus are added to the alumina substrate that was described previously in Example 1 and that comes in "extrudate" form. The impregnation solution is prepared by dissolution at 90° C. of molybdenum oxide (28.28 g) and cobalt hydroxide (6.57 g) in 15.85 g of an aqueous solution of 85% phosphoric acid and water. After homogenization of the preceding mixture, 38 g of citric acid has been added before adjustment of the solution volume to the pore volume of the substrate by addition of water. The molar ratio (citric acid)/Mo is equal to 1 mol/mol and that of (citric acid)/Co is equal to 2.7 mol/mol. After dry impregnation, the extrudates are allowed to mature under a water-saturated atmosphere for 24 hours at ambient temperature, and then they are dried at 120° C. for 16 hours. The thus obtained dried catalytic precursor is denoted C3. The final composition of the C3 catalyst, expressed in the form of oxides and relative to the dry catalyst mass, is then as follows: $MoO_3$=19.6±0.2% by weight, CoO=3.7±0.1% by weight, and $P_2O_5$=6.7±0.1% by weight.

The C4 catalyst according to the invention is prepared as follows. Cobalt, molybdenum, and phosphorus are added to the alumina substrate that is described in Example 1 and that comes in "extrudate" form. An impregnation solution has been prepared by dissolution at 90° C. of molybdenum oxide (39 g) and cobalt hydroxide (9.3 g) in 21.9 g of an aqueous solution of 85% phosphoric acid and water. After homogenization of the preceding mixture, 3-oxobutanoate of 2-methoxyethyl was added into the solution at 0.5 mol per mol of molybdenum or 1.4 mol per mol of cobalt to result in the C4 catalyst. The volume of the solution was adjusted to the pore volume of the substrate by addition of water before each impregnation. After dry impregnation, the extrudates of the two catalysts were allowed to mature under a water-saturated atmosphere for 24 hours at ambient temperature, and then dried at 120° C. for 16 hours. The final composition of the C4 catalyst that is expressed in the form of oxides and relative to the dry catalyst mass is then as follows: $MoO_3$=19.5±0.2% by weight, CoO=3.5±0.1% by weight, and $P_2O_5$=6.8±0.1% by weight.

Example 3: Preparation of the CoMoP Catalyst on C5 Alumina (Compliant with the Invention) by Pre-Impregnation 15.2 g of 3-oxobutanoate of 2-methoxyethyl that is diluted in water in such a way as to obtain a solution with the total volume equal to the pore volume of the substrate is added to the alumina substrate that is described above in Example 1 and that comes in the "extrudate" form. The thus formed solution is then impregnated in the dry state on the substrate before observing a maturation period of 3 hours under a water-saturated atmosphere and at ambient temperature, followed by a drying at 120° C. for 2 hours. The modified substrate is then impregnated by a new impregnation solution that is prepared by hot dissolution of molybdenum oxide (27.3 g) and cobalt hydroxide (6.5 g) in 15.3 g of an aqueous solution of 85% phosphoric acid and water by taking care to adjust—by adding water—the volume of this latter solution to the pore volume of the preceding modified substrate. After dry impregnation, the extrudates were allowed to mature under a water-saturated atmosphere for 24 hours at ambient temperature, and then dried at 120° C. for 16 hours to result in the C5 catalyst. The final composition of the C5 catalyst that is expressed in the form of oxides and relative to the dry catalyst mass is then as follows: $MoO_3$=19.7±0.2% by weight, CoO=3.5±0.1% by weight, and $P_2O_5$=6.8±0.1% by weight. The amounts involved are such that the amount of 3-oxobutanoate of 2-methoxyethyl is 0.5 mol per mol of molybdenum or 1.4 mol per mol of cobalt.

Example 4: HDS Evaluation of Diesel Fuel of the C1, C2 and C3 Catalysts (not Compliant with the Invention) and C4 and C5 Catalysts (Compliant with the Invention)

The C1, C2 and C3 catalysts (not compliant with the invention) and C4 and C5 catalysts (compliant with the invention) have undergone diesel fuel HDS testing.

of 2-methoxyethyl therefore provides an increase in the catalytic activity regardless of its method of introduction.

The advantage of the catalyst according to the invention is significant when it has a smaller proportion of organic compound than the C3 catalyst, thus with an inherent effectiveness of the 3-oxobutanoate of 2-methoxyethyl that is greater than that of the other compounds for which it is necessary to introduce a larger proportion of compound in order to observe a significant catalytic effect.

TABLE 1

Iso-Volume Relative Activity in Terms of Diesel-Fuel Hydrodesulfurization of C1, C2 and C3 Catalysts (Not Compliant with the Invention) and C4 and C5 Catalysts (Compliant with the Invention) in Relation to the C2 Catalyst (Non-Compliant)

| Catalyst (for comparison or according to the invention) | Organic compound that is used and molar ratio/Mo | Method for introduction of the organic compound (post-/co-/pre-impregnation) | Heat treatment | HDS activity |
| --- | --- | --- | --- | --- |
| C1 (comp) | None | Without an object | Dried 120° C. | Base + 1.0° C. |
| C2 (comp) | None | Without an object | Calcined | Base |
| C3 (comp) | Citric acid - 1.0 | CO | Dried 120° C. | Base − 2.9° C. |
| C4 (inv) | 3 - oxobutanoate of 2 - methoxyethyl - 0.5 | CO | Dried 120° C. | Base − 5.6° C. |
| C5 (inv) | 3 - oxobutanoate of 2 - methoxyethyl - 0.5 | PRE | Dried 120° C. | Base − 5.9° C. |

Characteristics of the diesel fuel feedstock that is used: density at 15° C.: 0.8522 g/cm$^3$, sulfur: 1.44% by weight.

Simulated Distillation:

PI: 155° C.

10%: 247° C.

50%: 315° C.

90%: 392° C.

PF: 444° C.

The test is conducted in an isothermal pilot reactor with a flushed fixed bed, with the fluids circulating upward. After sulfurization in situ at 350° C. in the pressurized unit by means of the diesel fuel of the test to which 2% by weight of dimethyl disulfide is added, the hydrodesulfurization test was conducted under the following operating conditions: a total pressure of 7 MPa, a catalyst volume of 30 cm$^3$, a temperature from 330 to 360° C., a hydrogen flow rate of 24 l/h, and a feedstock flow rate of 60 cm$^3$/h.

The catalytic performances of the tested catalysts are provided in Table 1. They are expressed in terms of degrees Celsius starting from a catalyst for comparison that is selected as a reference (C2): they correspond to the temperature deviation that is to be applied in order to reach 50 ppm of sulfur in the effluent. A negative value means that the sulfur content target is reached for a lower temperature, and there is therefore an increase in activity. A positive value means that the sulfur content target is reached for a higher temperature, and there is therefore a loss of activity. The results that are obtained are recorded in Table 1.

Table 1 clearly shows the increase in the catalytic effect provided by the 3-oxobutanoate of 2-methoxyethyl. Actually, the C4 and C5 catalysts (according to the invention) have higher levels of activity than those obtained for all of the other catalysts that were evaluated. The 3-oxobutanoate

The invention claimed is:

1. A catalyst, comprising a substrate based on alumina or silica or silica-alumina, at least one element from group VIII, at least one element from group VIB, and 2-methoxyethyl 3-oxobutanoate.

2. The catalyst according to claim 1, in which the content of the at least one element from group VIB is between 5 and 40% by weight that is expressed in terms of metal oxide from group VIB in relation to the total weight of the catalyst, and the content of the at least one element from group VIII is between 1 and 10% by weight that is expressed in terms of metal oxide from group VIII in relation to the total weight of the catalyst.

3. The catalyst according to claim 1, in which the molar ratio of the at least one element from group VIII to the at least one element from group VIB in the catalyst is between 0.1 and 0.8.

4. The catalyst according to claim 1, which further contains phosphorus, with the phosphorus content being between 0.1 and 20% by weight that is expressed in terms of $P_2O_5$ in relation to the total weight of the catalyst, and the ratio of phosphorus to the at least one element from group VIB in the catalyst is greater than or equal to 0.05.

5. The catalyst according to claim 1, in which the content of 2-methoxyethyl 3-oxobutanoate is between 1 and 45% by weight in relation to the total weight of the catalyst.

6. The catalyst according to claim 1, which further contains an organic compound other than 2-methoxyethyl 3-oxobutanoate that contains oxygen, nitrogen or sulfur, or a combination thereof.

7. The catalyst according to claim 6, in which said organic compound is a compound that comprises one or more chemical groups selected from the group consisting of the following chemical groups: carboxylic, alcohol, thiol, thioether, sulfone, sulfoxide, ether, aldehyde, ketone, ester, carbonate, amine, nitrile, imide, oxime, urea, and amide.

8. The catalyst according to claim 7, in which said organic compound is triethylene glycol, diethylene glycol, ethylene glycol, ethylenediaminetetraacetic acid, maleic acid, malonic acid, citric acid, dimethylformamide, N-methylpyrrolidone, propylene carbonate, bicine, or tricine.

9. The catalyst according to claim 1, which is at least partially sulfurized.

10. A catalyst according to claim 1, comprising a substrate based on alumina or silica or silica-alumina, at least one element from group VIII, at least one element from group VIB, and 2-methoxyethyl 3-oxobutanoate, which catalyst has not been calcined or which catalyst has not been calcined after the 2-methoxyethyl 3-oxobutanoate has been added to the catalyst.

11. A method for preparing the catalyst according to claim 1, comprising
  a) bringing into contact at least one component of an element from group VIB, at least one component of an element from group VIII, 2-methoxyethyl 3-oxobutanoate, and optionally phosphorus with a substrate based on alumina or silica or silica-alumina, or bringing into contact a regenerated catalyst that contains a substrate based on alumina or silica or silica-alumina, at least one component of an element from group VIB, at least one component of an element from group VIII, and optionally phosphorus with 2-methoxyethyl 3-oxobutanoate to obtain a catalyst precursor,
  b) drying said catalyst precursor obtained from step a) at a temperature lower than 200° C., without being calcined subsequently.

12. The method according to claim 11, in which step a) is the following step:
  a') impregnating a substrate based on alumina or silica or silica-alumina by at least one solution that contains at least one element from group VIB, at least one element from group VIII, 2-methoxyethyl 3-oxobutanoate, and optionally phosphorus to obtain a catalyst precursor.

13. The method according to claim 11, in which step a) comprises the following steps:
  a1) impregnating a substrate based on alumina or silica or silica-alumina by at least one solution that contains at least one element from group VIB, at least one element from group VIII, and optionally phosphorus to obtain an impregnated substrate,
  a2) drying the impregnated substrate that is obtained in step a1) at a temperature lower than 200° C. to obtain a dried impregnated substrate, and optionally calcining the dried impregnated substrate to obtain a calcined impregnated substrate,
  a3) impregnating the dried and optionally calcined impregnated substrate that is obtained in step a2) by an impregnation solution that comprises 2-methoxyethyl 3-oxobutanoate to obtain a catalyst precursor,
  a4) optionally allowing to mature the catalyst precursor that is obtained in step a3).

14. The method according to claim 11, in which step a) comprises the following steps:
  a1') preparing a substrate that comprises 2-methoxyethyl 3-oxobutanoate and optionally at least one part of phosphorus,
  a2') impregnating the substrate obtained in step a1') by an impregnation solution that comprises at least one element from group VIB, at least one element from group VIII, and optionally phosphorus to obtain a catalyst precursor,
  a3') optionally allowing to mature the catalyst precursor that is obtained in step a2').

15. The method according to claim 11, in which step a) comprises the following steps:
  a1") bringing into contact a solution that contains at least one element from group VIB, at least one element from group VIII, 2-methoxyethyl 3-oxobutanoate or at least one organic compound that contains oxygen, nitrogen or sulfur or a combination thereof, which at least one organic compound is not 2-methoxyethyl 3-oxobutanoate, and optionally phosphorus by co-impregnation with a substrate based on alumina or silica or silica-alumina to obtain an impregnated substrate,
  a2") drying the impregnated substrate obtained from step a1") at a temperature that is lower than 200° C., without being calcined subsequently, to obtain a dried impregnated substrate,
  a3") bringing into contact the dried impregnated substrate obtained from
  step a2") with a solution of 2-methoxyethyl 3-oxobutanoate or at least one organic compound that contains oxygen, nitrogen or sulfur or a combination thereof, which at least one organic compound is not 2-methoxyethyl 3-oxobutanoate, and which is identical to or different from said at least one organic compound in step a1") to obtain a catalyst precursor,
  a4") optionally allowing to mature the catalyst precursor that is obtained in step a3"),
  and 2-methoxyethyl 3-oxobutanoate is present in at least one of step a1") or step a3").

16. The method according to claim 11, in which step a) comprises the following steps:
  a1'") impregnating a regenerated catalyst that contains a substrate based on alumina or silica or silica-alumina, at least one component of an element from group VIB, at least one component of an element from group VIII, and optionally phosphorus by an impregnation solution that comprises 2-methoxyethyl 3-oxobutanoate to obtain a catalyst precursor,
  a2'") optionally allowing to mature the catalyst precursor that is obtained in step a1'").

17. The method according to claim 11, in which the molar ratio of 2-methoxyethyl 3-oxobutanoate to the at least one element from group VIII is between 0.1 and 5.0 mol/mol.

18. A method for at least one of hydrotreating and hydrocracking a hydrocarbon fraction, comprising performing said at least one of hydrotreating and hydrocracking in the presence of the catalyst according to claim 1.

19. A method for at least one of hydrotreating and hydrocracking a hydrocarbon fraction, comprising performing said at least one of hydrotreating and hydrocracking in the presence of the catalyst according to claim 10.

* * * * *